(12) United States Patent
McDonald et al.

(10) Patent No.: US 8,474,155 B2
(45) Date of Patent: Jul. 2, 2013

(54) ARTICLE OF FOOTWEAR WITH OUTSOLE WEB AND MIDSOLE PROTRUSIONS

(75) Inventors: Steven C. McDonald, Heber, UT (US); Bradley S. Long, Portland, OR (US)

(73) Assignee: Nike, Inc., Beaverton, OR (US)

( * ) Notice: Subject to any disclaimer, the term of this patent is extended or adjusted under 35 U.S.C. 154(b) by 860 days.

(21) Appl. No.: 12/272,551

(22) Filed: Nov. 17, 2008

(65) Prior Publication Data

US 2009/0126230 A1 May 21, 2009

Related U.S. Application Data

(63) Continuation-in-part of application No. 10/862,056, filed on Jun. 4, 2004, now Pat. No. 7,451,557, and a continuation-in-part of application No. 12/130,354, filed on May 30, 2008, now Pat. No. 8,146,272.

(51) Int. Cl.
*A43B 1/10* (2006.01)
*A43B 13/12* (2006.01)

(52) U.S. Cl.
USPC .............. 36/102; 36/103; 36/30 R; 36/59 A

(58) Field of Classification Search
USPC ............. 36/88, 103, 25 R, 15, 31, 30 R, 102, 36/59 A
See application file for complete search history.

(56) References Cited

U.S. PATENT DOCUMENTS

| | | |
|---|---|---|
| D16,018 S | 4/1885 | Elliott |
| 997,657 A | 7/1911 | Drake |
| 1,219,507 A | 3/1917 | Teare |
| D80,361 S | 1/1930 | Crowley |
| D90,057 S | 5/1933 | Van Cleef |
| 1,936,729 A | 11/1933 | Mebane |
| 2,162,912 A | 6/1939 | Craver |
| D115,636 S | 7/1939 | Sperry |
| 2,229,406 A | 1/1941 | Cutler |
| D125,431 S | 2/1941 | Starner |
| D196,491 S | 10/1963 | Papoutsy |
| D197,505 S | 2/1964 | Bingham, Jr. et al. |
| D200,846 S | 4/1965 | Bovay |
| D201,864 S | 8/1965 | Smith, III |
| 3,373,510 A | 3/1968 | Memole et al. |

(Continued)

FOREIGN PATENT DOCUMENTS

| | | |
|---|---|---|
| BE | 357280 | 1/1929 |
| FR | 2813766 | 3/2002 |

(Continued)

OTHER PUBLICATIONS

European Search Report Application No. 10178380.1-2318 mailed Dec. 21, 2010.

(Continued)

*Primary Examiner* — Jila M Mohandesi
(74) *Attorney, Agent, or Firm* — Banner & Witcoff, Ltd.

(57) ABSTRACT

An article of footwear is disclosed that includes an upper, an outsole, and a midsole. The upper is configured to receive a foot, and the outsole is secured to the upper. The outsole defines a plurality of apertures extending entirely through the outsole. In addition, the outsole has a ground-engaging surface positioned at a first elevation. The midsole is positionable such that a lower surface of the midsole extends into the apertures of the outsole and is exposed by the apertures.

15 Claims, 9 Drawing Sheets

U.S. PATENT DOCUMENTS

| | | | |
|---|---|---|---|
| 3,538,628 A | 11/1970 | Einstein, Jr. | |
| 3,662,478 A | 5/1972 | Schwab | |
| 3,846,919 A | 11/1974 | Milotic | |
| 4,267,650 A * | 5/1981 | Bauer | 36/101 |
| 4,420,894 A | 12/1983 | Glassman | |
| D278,851 S | 5/1985 | Austin | |
| 4,538,368 A | 9/1985 | Mugford | |
| D281,459 S | 11/1985 | Parker | |
| 4,562,651 A | 1/1986 | Frederick et al. | |
| 4,617,745 A | 10/1986 | Batra | |
| 4,741,114 A | 5/1988 | Stubblefield | |
| 4,745,693 A | 5/1988 | Brown | |
| 4,817,278 A | 4/1989 | Mullane | |
| D301,184 S | 5/1989 | Hase | |
| 4,825,563 A | 5/1989 | Strongwater | |
| D302,352 S | 7/1989 | Austin | |
| 4,850,122 A | 7/1989 | Schwab, Jr. | |
| D302,765 S | 8/1989 | Esser | |
| 4,887,369 A | 12/1989 | Bailey et al. | |
| 4,897,936 A | 2/1990 | Fuerst | |
| D307,816 S | 5/1990 | Schneider | |
| D307,817 S | 5/1990 | Schneider | |
| 4,974,344 A | 12/1990 | Ching | |
| D316,627 S | 5/1991 | Schneider | |
| 5,012,597 A | 5/1991 | Thomasson | |
| 5,083,385 A | 1/1992 | Halford | |
| 5,317,822 A | 6/1994 | Johnson | |
| 5,367,791 A | 11/1994 | Gross et al. | |
| 5,381,610 A | 1/1995 | Hanson | |
| 5,384,973 A | 1/1995 | Lyden | |
| 5,410,821 A | 5/1995 | Hilgendorf | |
| 5,425,184 A | 6/1995 | Lyden et al. | |
| 5,533,280 A | 7/1996 | Halliday | |
| 5,625,964 A | 5/1997 | Lyden et al. | |
| 5,661,915 A | 9/1997 | Smith | |
| 5,676,295 A | 10/1997 | Gelb | |
| D388,594 S | 1/1998 | Turner et al. | |
| D394,342 S | 5/1998 | Schneider | |
| 5,799,417 A | 9/1998 | Burke et al. | |
| 5,822,888 A | 10/1998 | Terry | |
| D414,317 S | 9/1999 | Lubart | |
| 5,980,351 A | 11/1999 | McCook | |
| 5,991,950 A | 11/1999 | Schenkel | |
| 6,023,857 A | 2/2000 | Vizy et al. | |
| 6,023,859 A | 2/2000 | Burke et al. | |
| 6,055,746 A | 5/2000 | Lyden et al. | |
| D433,792 S | 11/2000 | Cockrell | |
| 6,145,221 A | 11/2000 | Hockerson | |
| 6,202,325 B1 | 3/2001 | Kim | |
| D446,915 S | 8/2001 | Cockrell | |
| D446,916 S | 8/2001 | Cockrell | |
| D447,326 S | 9/2001 | Cockrell | |
| 6,311,413 B1 | 11/2001 | Chern et al. | |
| 6,449,878 B1 | 9/2002 | Lyden | |
| D463,901 S | 10/2002 | Adams et al. | |
| 6,481,121 B1 * | 11/2002 | Tucker | 36/62 |
| 6,574,889 B2 | 6/2003 | Cagner | |
| 6,601,042 B1 | 7/2003 | Lyden | |
| D483,934 S | 12/2003 | Adams et al. | |
| 6,915,596 B2 | 7/2005 | Grove et al. | |
| 6,931,766 B2 | 8/2005 | Greene | |
| D509,650 S | 9/2005 | Burg | |
| D509,949 S | 9/2005 | Wu | |
| D509,950 S | 9/2005 | Adams et al. | |
| D511,881 S | 11/2005 | Cockrell | |
| D514,287 S | 2/2006 | Cockrell | |
| 7,016,867 B2 | 3/2006 | Lyden | |
| 7,076,890 B2 | 7/2006 | Grove et al. | |
| D527,172 S | 8/2006 | Burg | |
| 7,107,235 B2 | 9/2006 | Lyden | |
| D529,694 S | 10/2006 | Cockrell | |
| D529,695 S | 10/2006 | Cockrell | |
| D529,696 S | 10/2006 | Cockrell | |
| D530,067 S | 10/2006 | Cockrell | |
| D530,894 S | 10/2006 | Cockrell | |
| D530,895 S | 10/2006 | Cockrell | |
| D531,788 S | 11/2006 | Rittberg | |
| 7,140,129 B2 * | 11/2006 | Newson et al. | 36/100 |
| D543,340 S | 5/2007 | Favreau et al. | |
| D545,036 S | 6/2007 | Roulo | |
| D553,835 S | 10/2007 | McClaskie | |
| D562,541 S | 2/2008 | Avar | |
| 7,331,123 B2 * | 2/2008 | Workman et al. | 36/15 |
| 7,444,763 B2 | 11/2008 | Grove et al. | |
| 7,451,557 B2 * | 11/2008 | McDonald et al. | 36/100 |
| 2003/0051372 A1 | 3/2003 | Lyden | |
| 2003/0069807 A1 | 4/2003 | Lyden | |

FOREIGN PATENT DOCUMENTS

| | | |
|---|---|---|
| GB | 1518866 | 7/1978 |
| WO | 97/46127 | 12/1997 |
| WO | 9746127 | 12/1997 |
| WO | 2004/066771 | 8/2004 |
| WO | 2004066771 | 8/2004 |
| WO | 2004/103105 | 12/2004 |
| WO | 2004103105 | 12/2004 |

OTHER PUBLICATIONS

PCT/US2005/019897, International Search Report, mailed Oct. 4, 2005.

Two page redacted excerpt from a letter dated Apr. 21, 2010 from a Third Party to NIKE, Inc.

* cited by examiner

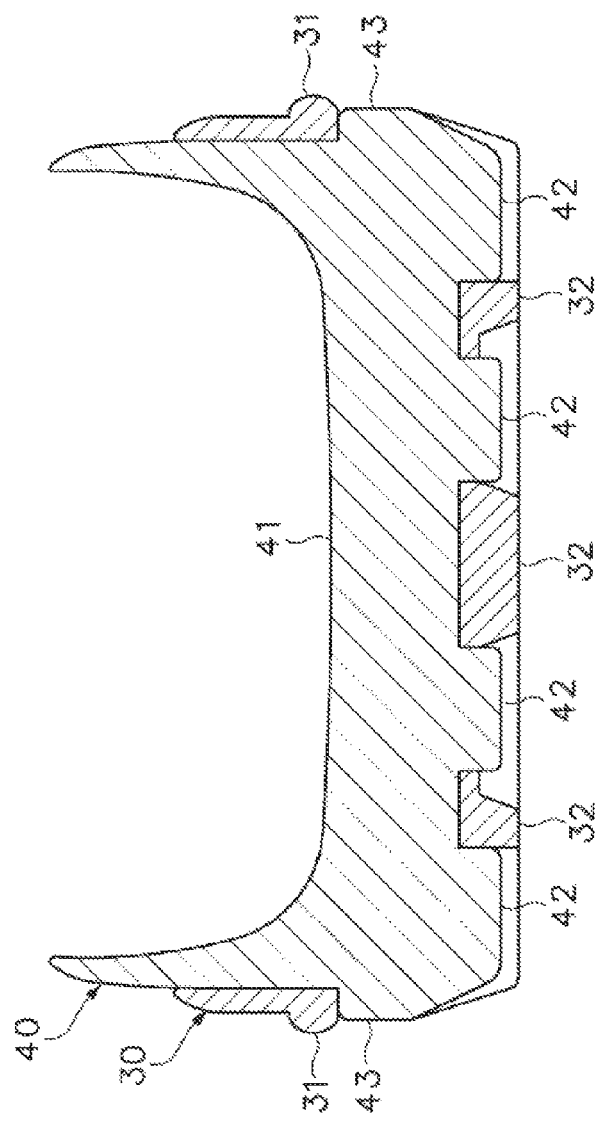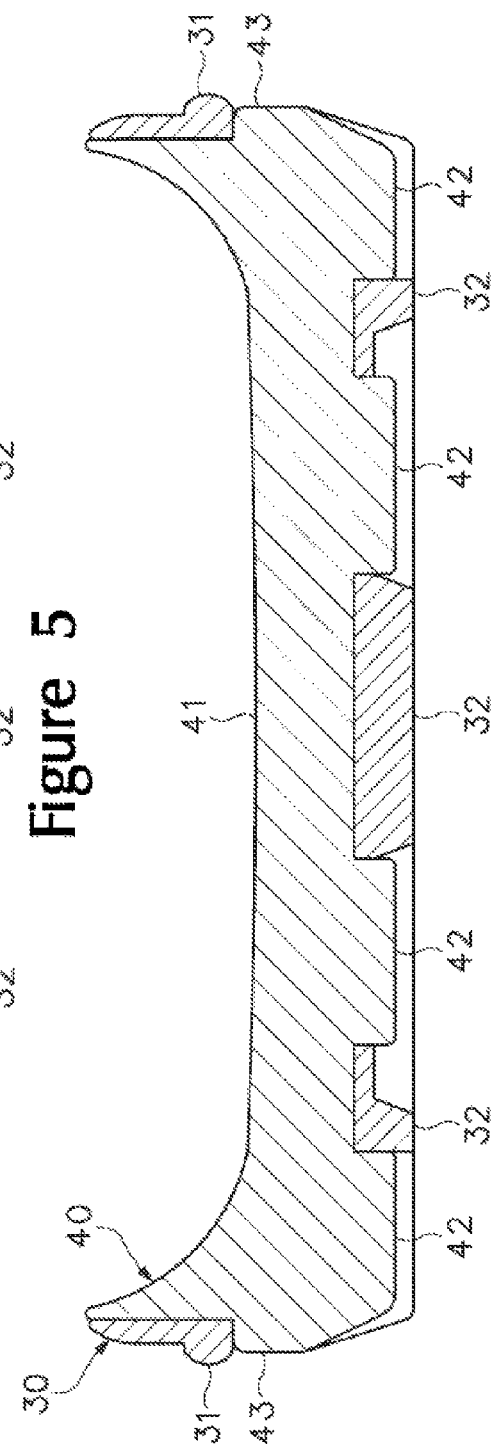

ARTICLE OF FOOTWEAR WITH OUTSOLE WEB AND MIDSOLE PROTRUSIONS

CROSS-REFERENCE TO RELATED APPLICATIONS

This application is a continuation-in-part of copending U.S. application Ser. No. 10/862,056, entitled "Article of Footwear with a Removable Midsole Element," filed Jun. 4, 2004, and U.S. patent application Ser. No. 12/130,354, entitled "Outsole Having Grooves Forming Discrete Lugs," filed May 30, 2008, both of which are incorporated herein in their entirety.

TECHNICAL FIELD

The present invention relates to footwear. The invention concerns, more particularly, an article of footwear with an outsole having a plurality of apertures through which a plurality of corresponding midsole protrusions extend.

BACKGROUND

Conventional articles of footwear generally include two primary elements, an upper and a sole structure. The upper is secured to the sole structure and forms a void on the interior of the footwear for securely and comfortably receiving a foot. The upper is generally formed from multiple elements that are stitched and adhesively bonded together to form a comfortable structure for receiving the foot. More particularly, conventional footwear may include, for example, an exterior formed of leather and textile materials that are resistant to abrasion and provide the footwear with a particular aesthetic. Foam materials may be located on the interior of the upper to enhance the comfort of the upper, and moisture-wicking textiles may be positioned adjacent the foot to limit the quantity of perspiration within the upper.

The sole structure attenuates ground reaction forces and absorbs energy as the footwear contacts the ground, and often incorporates at least two discrete layers that are conventionally referred to as a midsole and an outsole. The midsole forms the middle layer of the sole and serves a variety of purposes that include controlling foot motions, such as pronation, and shielding the foot from substantial ground reaction forces. The outsole forms the ground-contacting element of footwear and is usually fashioned from a durable, wear resistant material that includes texturing to improve traction. The sole structure may also include an insole, which is a thin, impact attenuating member located within the upper and adjacent to a sole of the foot to enhance footwear comfort.

Flexibility in the article of footwear aids in performance, durability, comfort, etc. of the article of footwear. Accordingly, an article of footwear having increased or improved flexibility throughout the article of footwear is desired.

SUMMARY OF THE INVENTION

The following presents a general summary of aspects of the invention in order to provide a basic understanding of the invention and various features of it. This summary is not intended to limit the scope of the invention in any way, but it simply provides a general overview and context for the more detailed description that follows.

Aspects of the disclosure relate to an article of footwear having an upper, an outsole, and a midsole. The upper is configured to extend around at least a portion of a foot, and the outsole is secured to the upper. The outsole defines a plurality of apertures extending entirely through the outsole. In addition, the outsole has a ground-engaging surface positioned at a first elevation. The midsole is separate from the upper and the outsole. The midsole is also positionable within the upper such that a lower surface of the midsole extends into the apertures of the outsole and is exposed by the apertures. The lower surface is positioned at a second elevation, the first elevation being less than the second elevation.

The outsole forms a web that extends between opposite sides of the upper, and the web defines the apertures. The outsole may also include a rim section that extends around a periphery of the footwear. In some arrangements, the midsole includes a foot-supporting portion and a plurality of protrusions that extend downward from the foot-supporting portion. The protrusions have a configuration that extends into the apertures of the outsole and is exposed by the apertures. A lower surface of the foot-supporting portion may contact an upper surface of the outsole. An upper surface of the foot-supporting portion may also be contoured to include a raised periphery, and an insole may be positioned adjacent the upper surface of the midsole.

In some arrangements, the outsole may include a plurality of outsole strips forming the web and apertures. The midsole may include a plurality of protrusions that extend through the apertures. The midsole may also include a plurality of recesses configured to receive the outsole strips.

DESCRIPTION OF THE DRAWINGS

The foregoing Summary of the Invention, as well as the following Detailed Description of the Invention, will be better understood when read in conjunction with the accompanying drawings.

FIG. 5 is a first cross-sectional view of the article of footwear, as defined by section line 5-5 in FIG. 2.

FIG. 6 is a second cross-sectional view of the article of footwear, as defined by section line 6-6 in FIG. 2.

Figure 1:
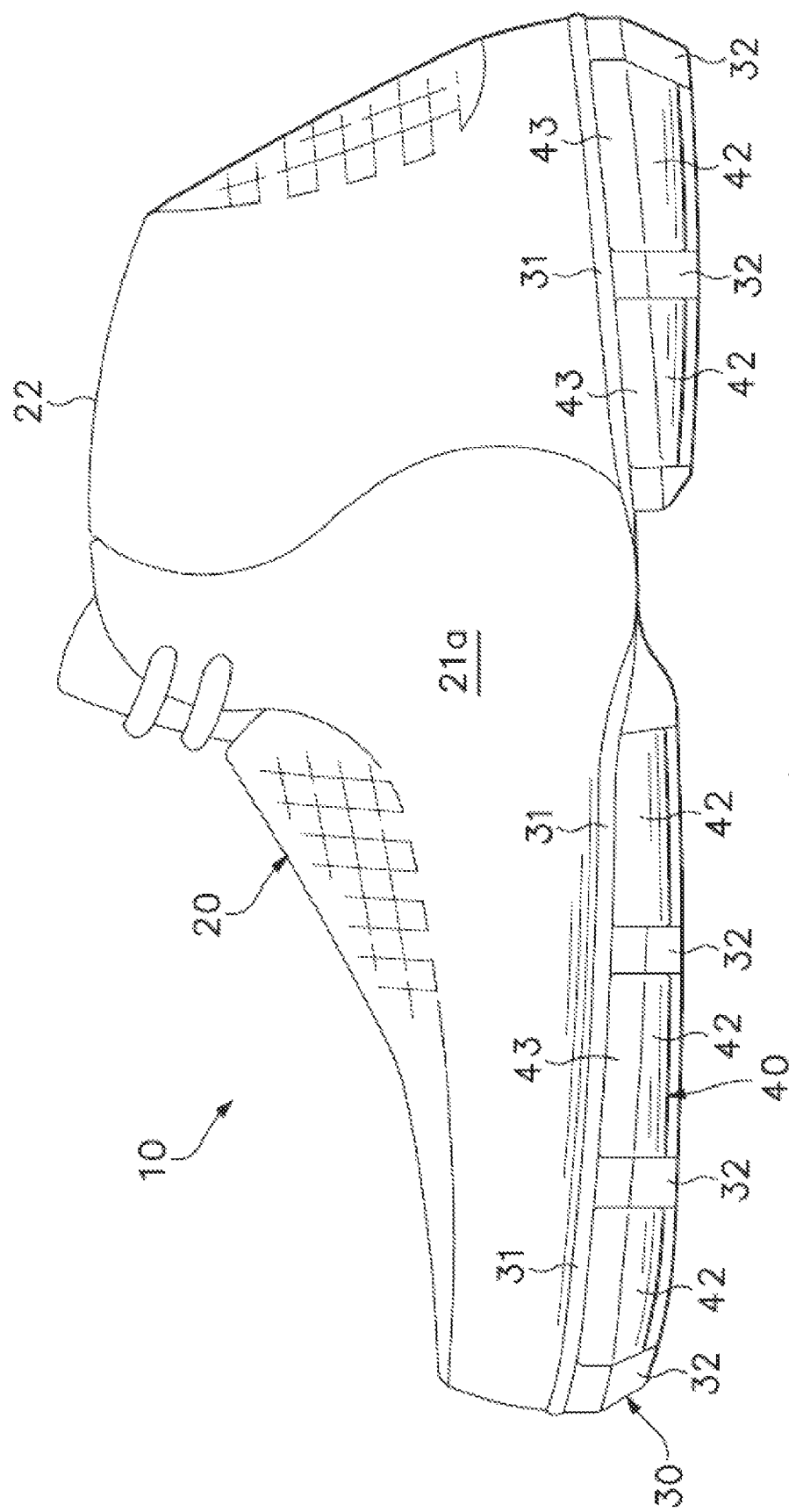
FIG. 1 is a side elevational view of an article of footwear in accordance with the present invention.
Figure 2:
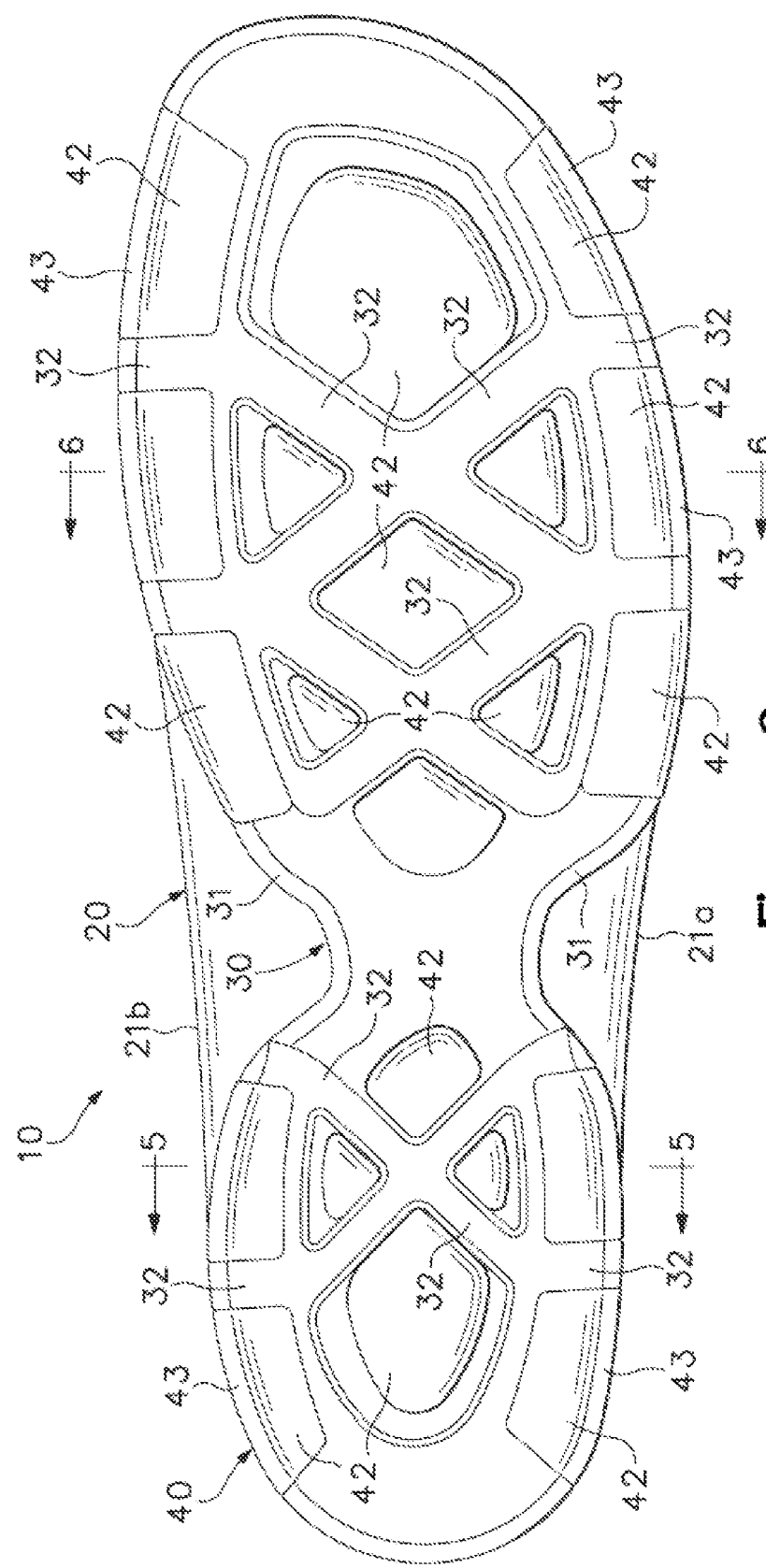
FIG. 2 is a bottom plan view of the article of footwear.
Figure 3:
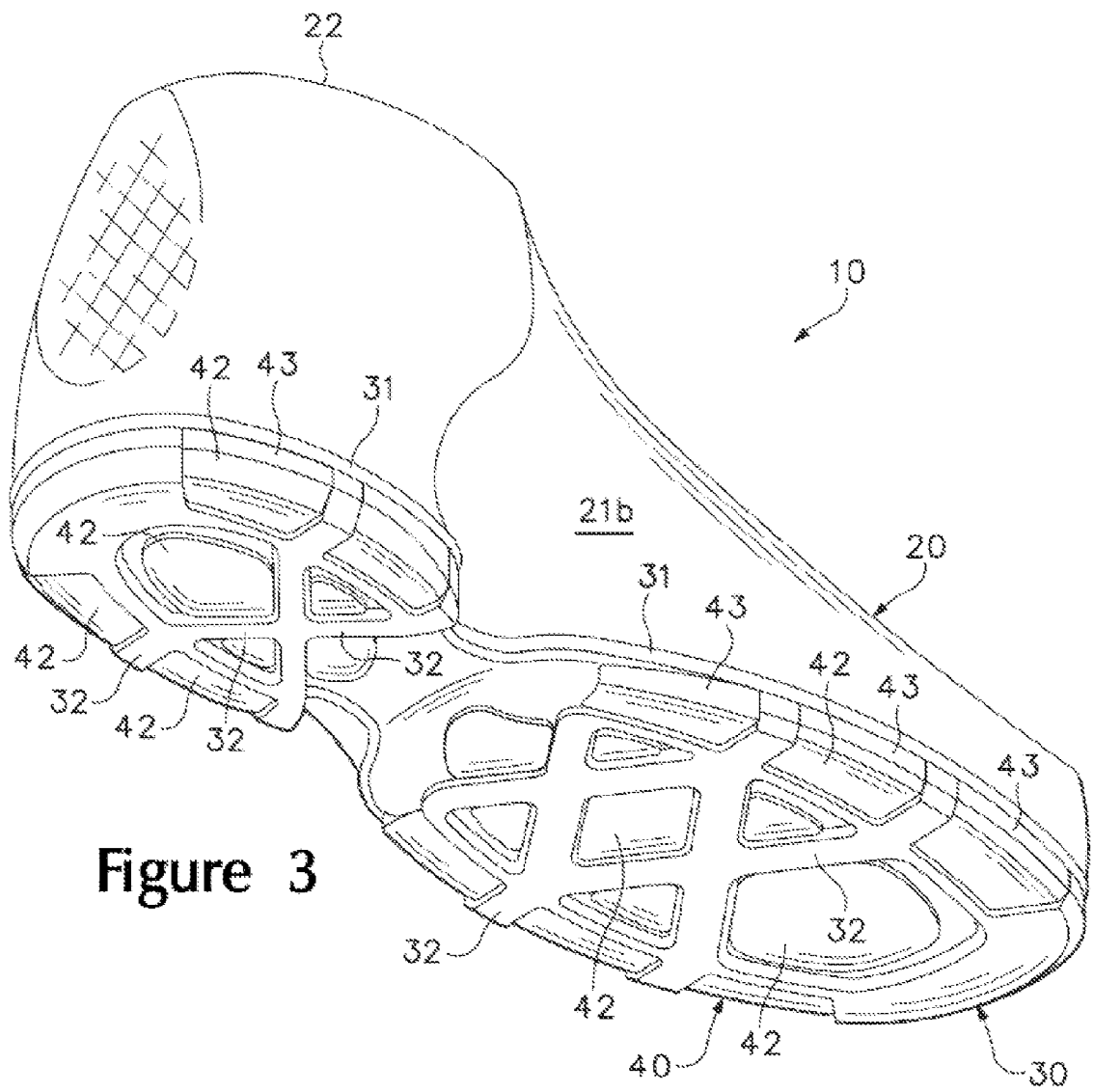
FIG. 3 is a perspective view of the article of footwear.
Figure 4:
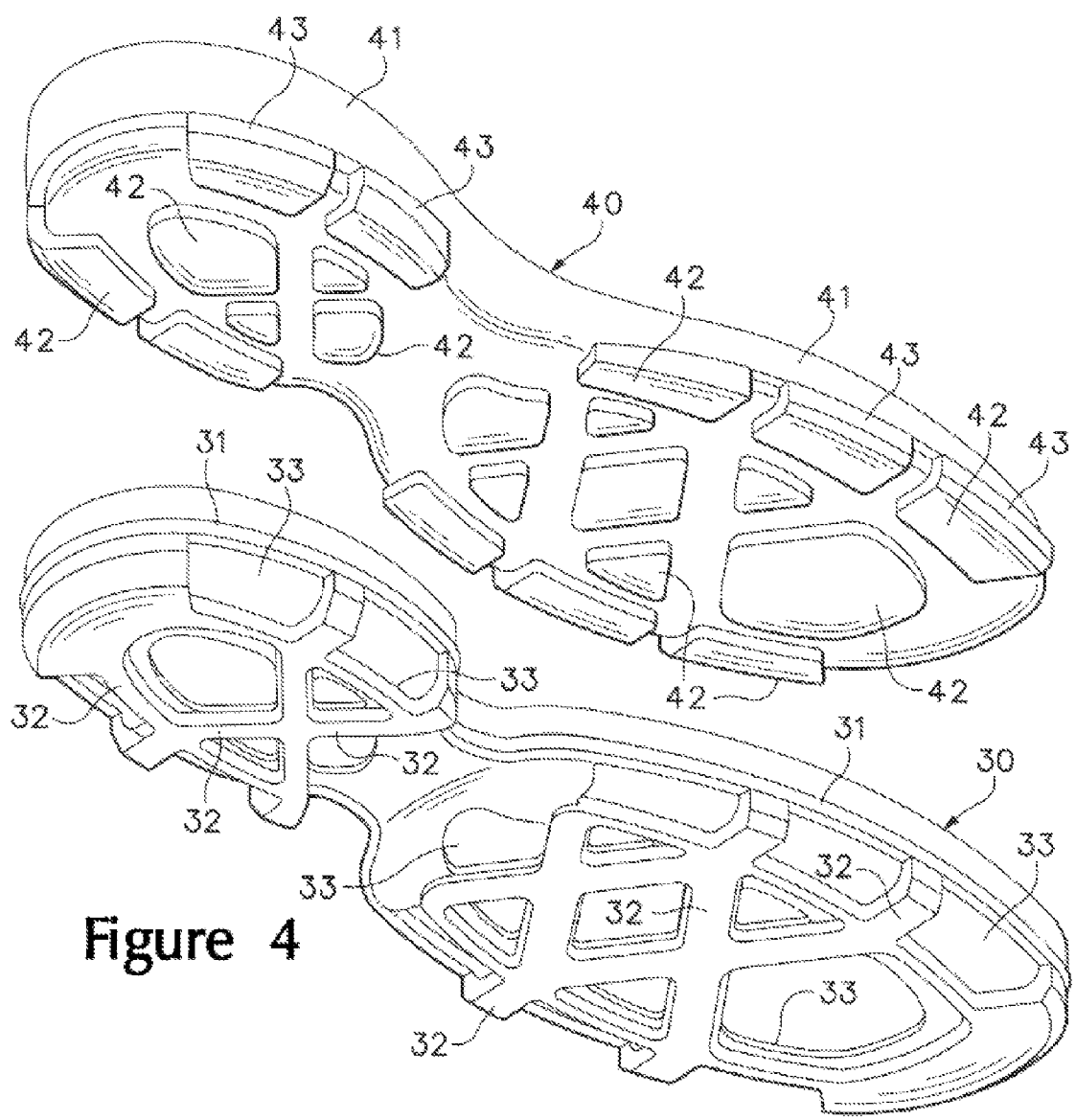
FIG. 4 is an exploded perspective view of the article of footwear.

The reader is advised that the attached drawings are not necessarily drawn to scale.

DETAILED DESCRIPTION OF THE INVENTION

The following discussion and accompanying FIGS. 1-6 disclose an article of footwear 10 having an upper 20, an outsole 30, a midsole 40 in accordance with the present invention. Upper 20 is secured to outsole 30 to form a single element. Midsole 40, however, is separable from the combination of upper 20 and outsole 30. This structure provides a plurality of advantages over the conventional, non-separable articles of footwear. For example, either midsole 40 or the combination of upper 20 and outsole 30 may be separately cleansed in a manner that best suits the respective materials forming each component. If one of midsole 40 or the combination of upper 20 and outsole 30 becomes worn or otherwise damaged, the damaged component may be replaced without the necessity of replacing the undamaged component, and the damaged component may be more easily recycled. Furthermore, midsole 40 or the combination of upper 20 and outsole 30 may be interchanged with alternate components to suit a particular activity or a preference of an individual.

Upper 20 exhibits a generally conventional structure incorporating a plurality of elements that are stitched or otherwise connected to form a comfortable structure for receiving the foot. Suitable materials for upper 20 include various textiles, foam, leather, and polymer materials that are stitched or adhesively bonded together. The textile materials, for example may include a mesh cloth that provides enhanced air-permeability and moisture-wicking properties. The foam materials may be a lightweight thermoset foam that conforms to the shape of the foot and enhances the comfort of footwear 10. Finally, the leather and polymer materials may be positioned in high-wear portions of upper 20, or in portions of upper 20 that require additional stretch-resistance or support. In some embodiments, and as depicted in the figures, upper 20 may be primarily formed from a synthetic leather material that is supplemented with woven structures that stretch and conform with the shape of the foot. Accordingly, upper 20 may be manufactured from generally conventional materials.

The various elements forming upper 20 define a lateral side 21a, an opposite medial side 21b, and an ankle opening 22. Lateral side 21a and medial side 21b generally cover the sides, heel, and instep portion of the foot, and may include laces or another adjustment system for tightening upper 20 around the foot and securing the foot within footwear 10. Lateral side 21a and medial side 21b define ankle opening 22 and extend downward from ankle opening 22 to join with outsole 30. Ankle opening 22 provides access to a void within upper 20 that accommodates both midsole 40 and the foot. Lateral side 21a, medial side 21b, and ankle opening 22 have, therefore, a generally conventional configuration. As discussed above, midsole 40 is separable from the combination of upper 20 and outsole 30. Ankle opening 22 provides, therefore, access to the void within upper 20 and also an area for removing and inserting midsole 40.

Outsole 30 is permanently secured to a lower portion of upper 20 to form a lower, ground-engaging surface of footwear 10. A variety of attachment techniques may be utilized for permanently securing outsole 30 to lateral side 21a and medial side 21b, including stitching, adhesive bonding, thermobonding, or a combination of stitching and bonding, for example. Outsole 30 may be a single element or a plurality of elements that are joined together. Suitable materials for outsole 30 include any of the various abrasion-resistant rubber materials that are conventionally utilized in footwear outsoles, including blown rubber, carbon rubber or a combination of blown and carbon rubbers. As utilized in the present document, the term "permanently secured" encompasses various securing techniques (e.g. stitching, adhesives, and thermobonding) that a consumer is not intended to modify.

Outsole 30 includes a rim section 31 and a plurality of elements 32 that define multiple apertures 33. Rim section 31 extends around the periphery of outsole 30 and is joined with upper 20, thereby permanently joining upper 20 and outsole 30 together. Elements 32 are relatively thin members that extend across a lower surface of footwear 10 to provide portions of outsole 30 that engage the ground. More particularly, elements 32 extend generally from lateral side 21a to medial side 21b, for example, and are spaced to define the various apertures 33 and expose a lower surface of midsole 40. That is, elements 32 generally form a web structure in outsole 30. Apertures 33, as depicted in the figures, exhibit generally rectangular, triangular, and diamond-shaped configurations. In further embodiments of the invention, however, apertures 33 may exhibit a variety of other shapes or combinations of shapes, including circular, oval, hexagonal, octagonal, square, or other geometrical or non-geometrical shapes, for example. Accordingly, the specific shape of apertures 33 may vary considerably within the scope of the present invention.

Figure 7:
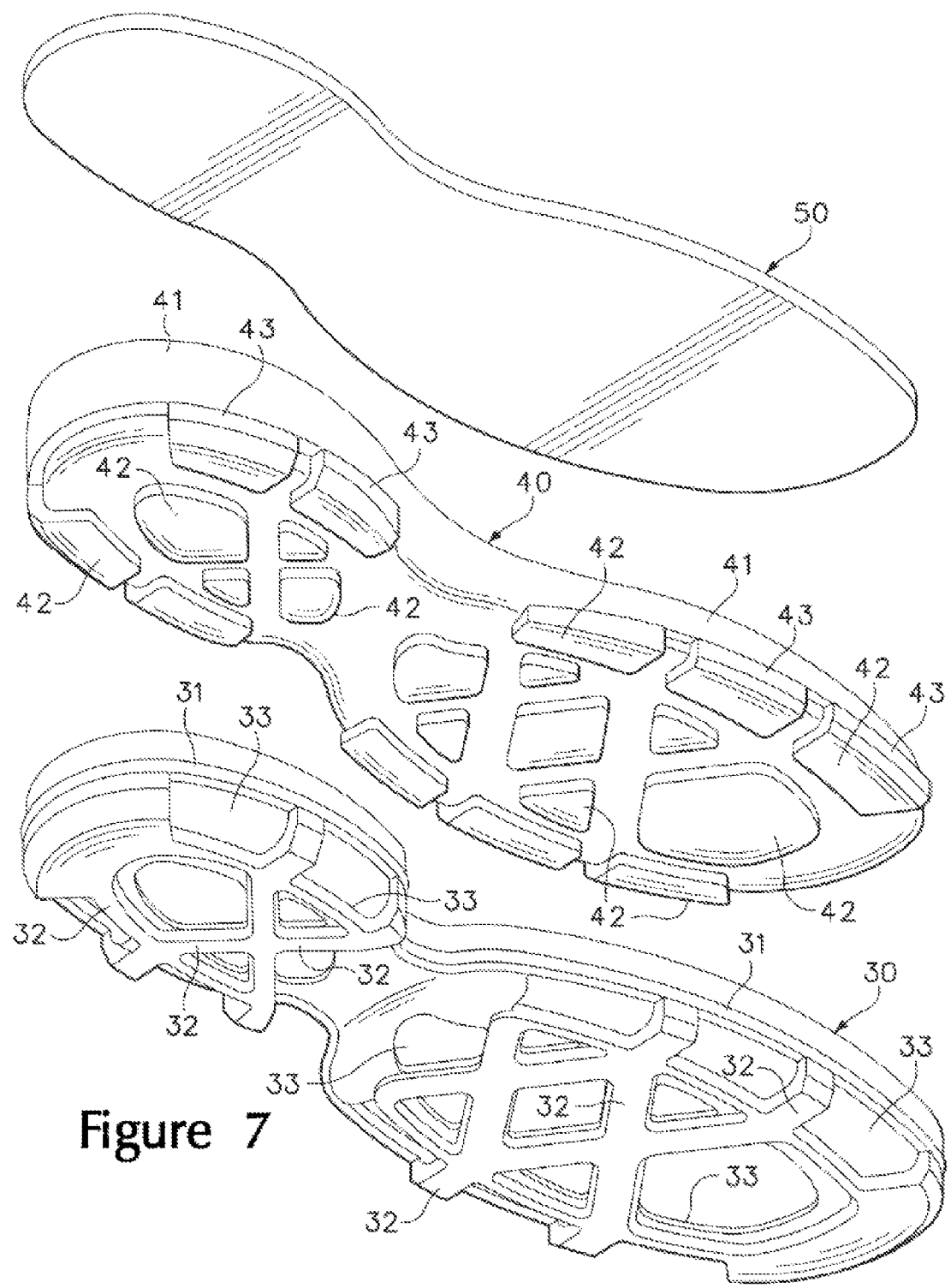
FIG. 7 is an exploded perspective view of another embodiment of the article of footwear.

Midsole 40 is separable from the combination of upper 20 and outsole 30 by disengaging midsole 40 from outsole 30 and drawing midsole 40 through ankle opening 22, thereby removing midsole 40 from the void formed within upper 20. The primary elements of midsole 40 are a foot-supporting portion 41 and a plurality of projections 42. Foot-supporting portion 41 extends from a heel portion to a forefoot portion of footwear 10 and provides an upper surface for contacting and supporting the foot. The upper surface of foot-supporting portion 41 may be contoured to conform with a natural shape of the foot. Peripheral areas of foot-supporting portion 41 may also be raised to form a general depression in the upper surface of midsole 40, thereby providing an area for securely receiving the foot. In order to enhance the comfort of midsole 40, a generally conventional insole 50 may extend over the upper surface of foot-supporting portion 41, as depicted in FIG. 7. That is, insole 50 may be positioned to extend between midsole 40 and the foot, and insole 50 may also be removable in the same general manner as midsole 40.

A lower surface of foot-supporting portion 41 contacts the various elements 32 when midsole 40 is received by the combination of upper 20 and outsole 30. In addition, projections 42 extend downward and into apertures 33. Projections 42 exhibit the general shape of apertures 33. Those projections 42 that are located in peripheral areas of midsole 40, however, may include a flange 43 that extends under rim section 31 to secure midsole 40 in position relative to outsole 30. In addition to extending downward, those projections 42 that are located in peripheral areas of midsole 40 also extend laterally to form flanges 43. In combination with outsole 30, flanges 43 extend under rim section 31 to secure the position of midsole 40.

Midsole 40 is formed of a polymer foam material that provides impact attenuation as footwear 10 contacts the ground. More specifically, midsole 40 operates to attenuate ground reaction forces and absorb energy as midsole 40 is compressed between the foot and the ground. This may occur, for example, during various ambulatory activities that involve either walking or running. Suitable materials for midsole 40 are, therefore, any of the conventional polymer foams that are utilized in the midsoles of athletic footwear, such as ethylvinylacetate and polyurethane foam. Midsole 40 may also incorporate a fluid-filled bladder in the heel portion or along the entire length of foot-supporting portion 41 in order to provide additional impact attenuation, as disclosed in U.S. Pat. Nos. 4,183,156; 4,219,945; 4,906,502; and 5,083,361 to Marion F. Rudy and U.S. Pat. Nos. 5,993,585 and 6,119,371 to David A. Goodwin et al., for example.

When midsole 40 is properly positioned within upper 20 and joined with outsole 30, projections 42 extend downward and into apertures 33. The shapes of projections 42 generally correspond with the shapes of apertures 33 to provide a secure connection between outsole 30 and midsole 40. The secure connection ensures, for example, that midsole 40 remains properly positioned relative to upper 20 during walking, running, or other ambulatory activities. The secure connection also ensures that debris (e.g., dirt, stones, twigs) do not enter upper 20 through apertures 33. In order to enhance the secure connection, flanges 43 extend under rim section 31, as discussed above. The combination of flanges 43 and rim section 31 discussed above provides an example of a mechanical locking system that is suitable for footwear 10. In some embodiments, a locking system may not be necessary to form a secure connection between sole structure 30 and upper 20. In other embodiments, a friction fit between outsole 30 and midsole 40, various pins that extend through outsole 30 and into midsole 40, or a temporary adhesive may be utilized. Accordingly, the use of an aperture edge and flange (i.e., rim section 31 and flanges 43) is not the only type of mechanical locking system that may be utilized to form a secure connection between sole structure 30 and upper 20.

Projections 42 extend downward and into apertures 33, and projections 42 are exposed by apertures 33. Although projections 42 extend downward and into apertures 33 and are exposed, a lower surface of the various projections 42 remains at a higher elevation than a lower surface of elements 32. This configuration ensures that outsole 30 is the primary element of footwear 10 that contacts or otherwise engages the ground. If, for example, the lower surface of the various projections 42 was at a lower elevation than the lower surface of elements 32, then midsole 40 would provide the primary ground-engaging element of footwear 10 and would be subject to considerable abrasive forces. As discussed above, however, outsole 30 is formed from an abrasion-resistant rubber material, whereas midsole 40 is formed from a polymer foam. Outsole 30 is, therefore, formed from a material that is more capable of withstanding the abrasive forces associated with walking, running, or other ambulatory activities. In some embodiments of the invention, however, the lower surface of projections 42 may be covered by an abrasion-resistant material to enhance the durability of midsole 40.

Although the lower surface of the various projections 42 remains at a higher elevation than a lower surface of elements 32, the lower surface of the various projections 42 may still contact the ground as outsole 30 and midsole 40 are compressed between the foot and the ground. A majority of the abrasive forces associated with walking, running, or other ambulatory activities, however, may still be absorbed by outsole 30. Accordingly, the difference in elevations between outsole 30 and the lower surface of the various projections 42 is not intended to prevent midsole 40 from contacting the ground. Rather, the difference in elevations operates to limit the degree to which the abrasive forces wear or otherwise degrade midsole 40.

The structure of footwear 10 described above provides a variety of advantages over conventional footwear, wherein the sole is permanently attached to the upper. During running, for example, some individuals may prefer a sole structure that limits the degree to which the foot pronates upon contact with the ground. The same individual, however, may prefer a sole structure that exhibits a high degree of stability during court-style activities, such as basketball or tennis. Rather than purchase multiple pairs of upper-sole structure combinations that are permanently secured together, the individual may acquire the combination of upper 20 and outsole 30, and the individual may acquire multiple midsoles 40, each midsole 40 being suitable for different activities. The individual may then select one of the multiple midsoles 40 for use with the combination of upper 20 and outsole 30. Similarly, the individual may acquire multiple combinations of upper 20 and outsole 30 for use with a single midsole 40.

The combination of upper 20 and outsole 30 includes different materials than midsole 40. Whereas midsole 40 is formed primarily from a polymer foam material, the combination of upper 20 and outsole 30 are formed from different materials. The respective portions of footwear 10 may benefit, therefore, from cleansing techniques that are specifically suited to their respective materials. Accordingly, the combination of upper 20 and outsole 30 may be separated from midsole 40 and each may be cleansed in an appropriate manner.

Midsole 40 is formed from a polymer foam material. Following significant use, the various cells within the polymer foam material may experience compression set or otherwise degrade, or midsole 40 may become significantly worn. Rather than dispose of footwear 10, midsole 40 may be properly recycled and replaced with an alternate midsole 40, thus extending the lifespan of footwear 10. Similar considerations apply to the combination of upper 20 and outsole 30.

With regard to recycling, a significant portion of footwear 10 and many conventional articles of footwear is the midsole. As discussed above, the midsole of conventional articles of footwear is permanently secured to the upper and outsole. This configuration increases the difficulty of recycling the midsole or other footwear components. In footwear 10, however, midsole 40 is separable from the combination of upper 20 and outsole 30. In comparison with the conventional footwear, therefore, midsole 40 may be recycled with significantly greater efficiency.

From an aesthetic viewpoint, the interchangeability of midsole 40 and the combination of upper 20 and outsole 30 also provides the individual with the ability to customize the appearance of footwear 10. For example, footwear 10 may be purchased with a first color combination. By interchanging midsole 40 with an alternate midsole 40, for example, the color combination of footwear 10 may be customized to the preferences of the individual. Support for a particular athletic team, for example, may also be demonstrated by selecting midsole 40 and the combination of upper 20 and outsole 30 to reflect the colors of the athletic team.

Figure 8:
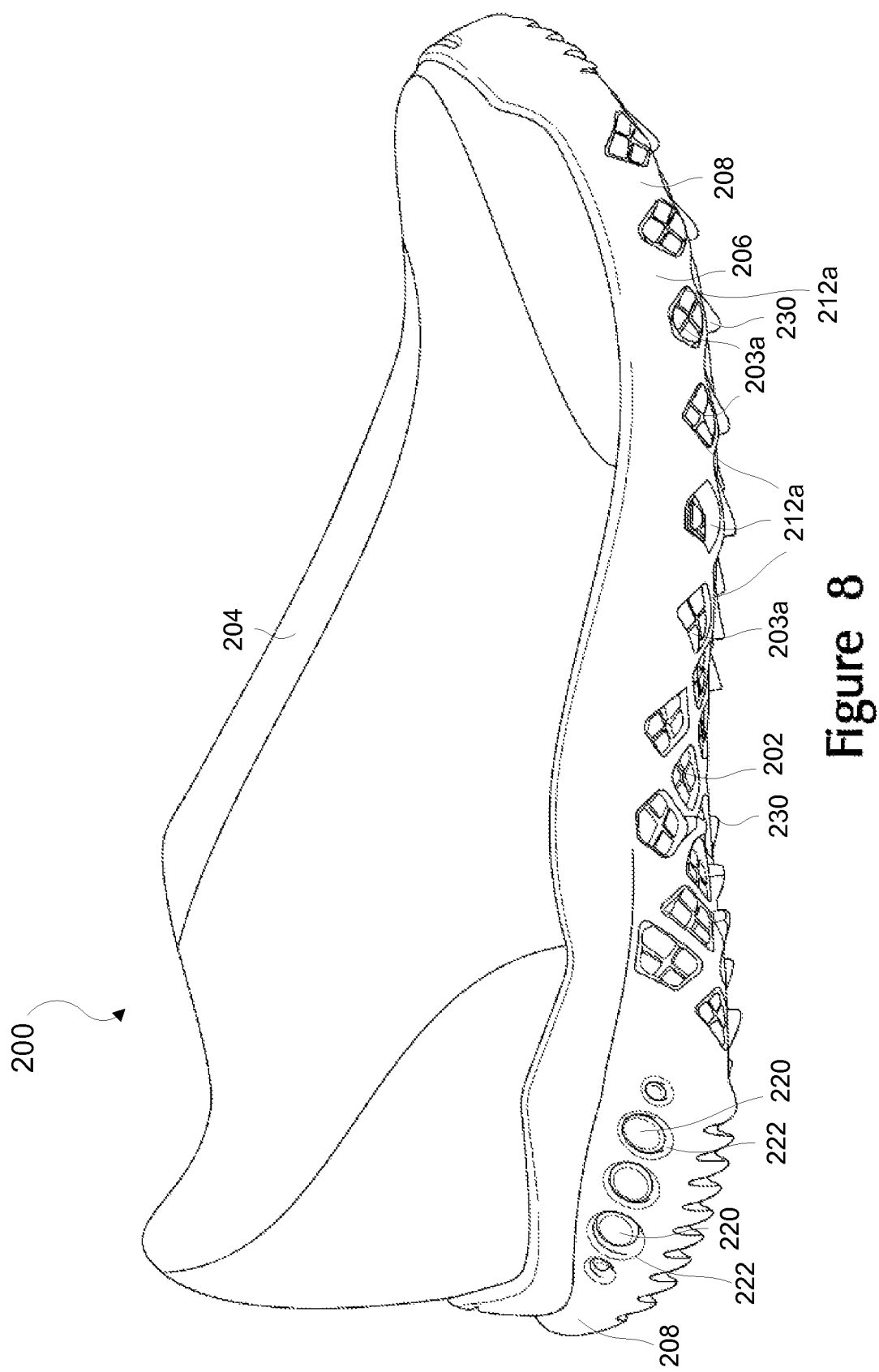
FIG. 8 is a side view of an alternative arrangement of an article of footwear having an outsole with a plurality of apertures through which a corresponding plurality of midsole protrusions extends according to aspects described herein.
Figure 9:
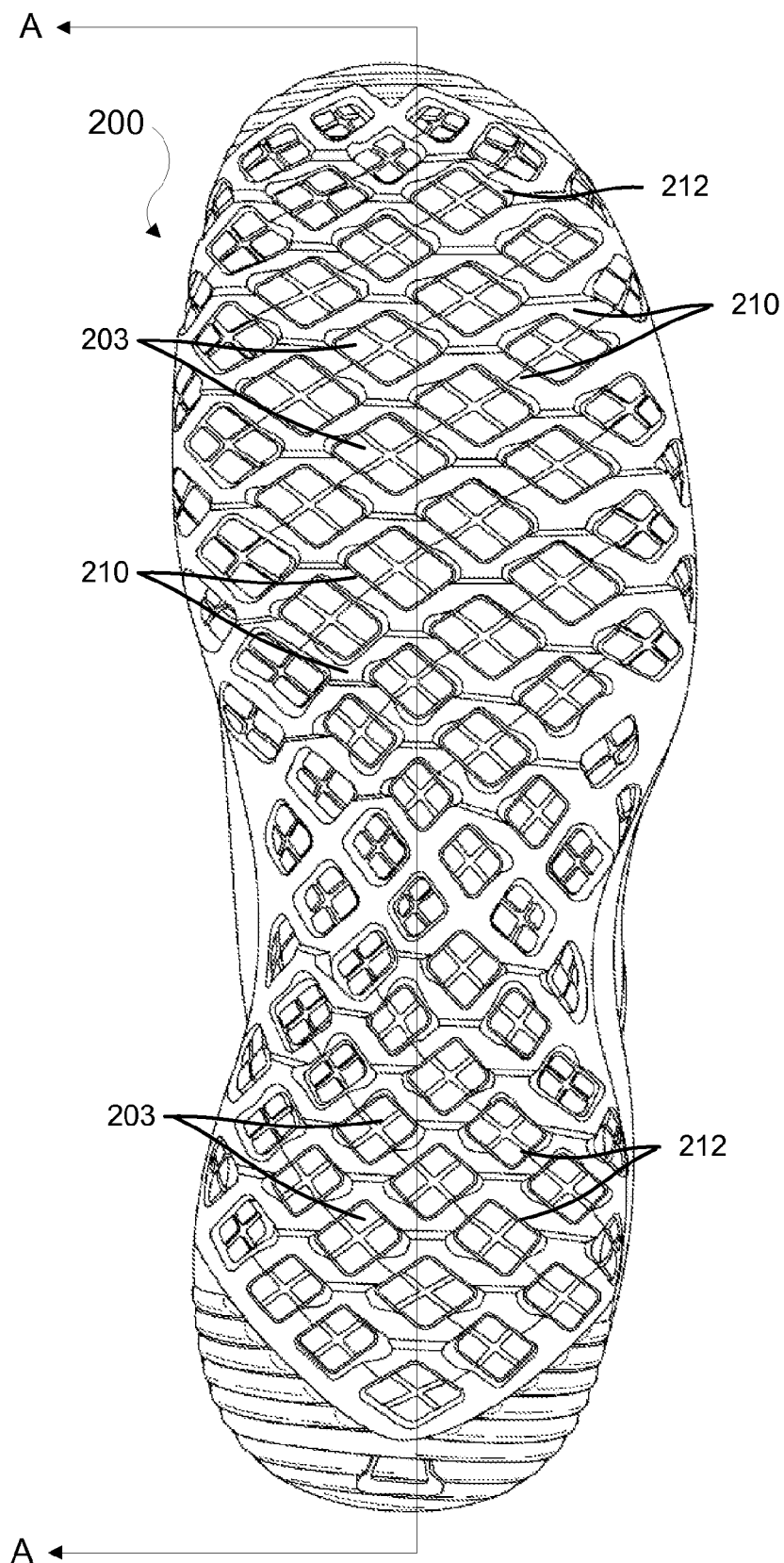
FIG. 9 is a bottom view of the article of footwear of FIG. 8 according to aspects described herein.
Figure 10:
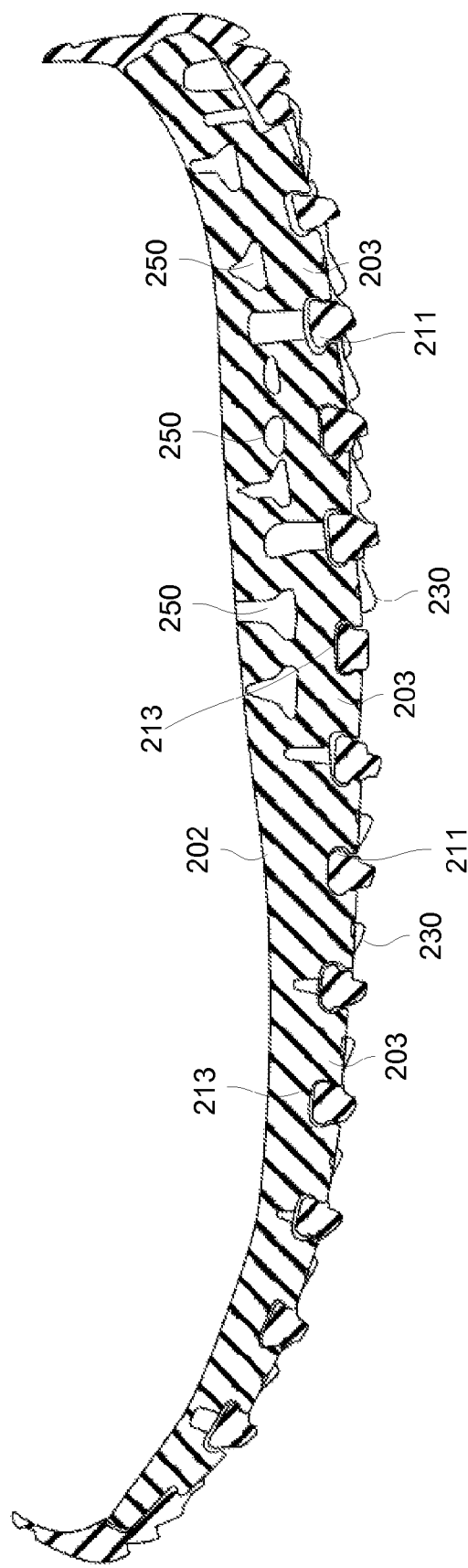
FIG. 10 is a cross-sectional view of the article of footwear of FIGS. 8 and 9, taken along line A-A of FIG. 9, according to aspects described herein.

In some alternate arrangements, the midsole may not be removable from the article of footwear, as shown in FIGS. 8-10. For instance, the midsole 202 may be a unitary member extending from a toe region of the article of footwear 200 to a heel region and permanently secured to one or more of an insole (not shown), upper 204 and outsole 206. In some arrangements, the lower surface of the insole may be in contact with an upper surface of the midsole and the midsole may be secured to the insole. The article of footwear 200 shown also includes an outsole 206 that may be secured to the upper 204. The various parts or portions of the article of footwear 200 may be secured to other parts or portions via known methods, such as adhesives, stitching, and the like.

The outsole 206 shown generally includes a rim 208 portion that extends around or substantially around the upper 204 of the article of footwear 200. The rim portion 208 may be secured to the upper 204, such as permanently secured via adhesives, stitching, and the like. The outsole 206 further includes a plurality of strips (210 in FIG. 9) that extend substantially diagonally from a lateral side of the article of footwear 200 to a medial side of the article of footwear 200. The strips 210 are arranged to form a mesh or web having apertures 212 or openings between the strips 210. Although the strips 210 shown are arranged diagonally to create diamond shaped apertures, other shapes, configurations and arrangements may be used to form apertures of other shapes. For instance, the outsole strips 210 may be positioned in a grid pattern with lengthwise and lateral strips being substantially perpendicular to each other in order to form apertures in a square or rectangular shape. Other shapes or arrangements may also be used.

The article of footwear 200 also includes a midsole element 202. The midsole 202 may be connected to an insole, the upper 204 and/or the outsole 206. In some arrangements, the midsole 202 may be connected to the insole and/or upper 204 but is not secured to the outsole 206. That is, the midsole 202 may be capable of movement relative to the outsole 206. The midsole 202 also includes a plurality of protrusions 203 arranged on a bottom surface of the midsole 202, at least a portion of a side surface of the midsole and/or along the periphery or edge joining the bottom surface of the midsole 202 and the side surface of the midsole 202. These protrusions 203 are generally shaped to correspond to the shape of the apertures 212 formed by the outsole 206. For instance, in the arrangement shown, the protrusions 203 are generally diamond shaped to correspond to the diamond shaped apertures 212 formed by the outsole strips 210.

As shown, the protrusions 203 of the midsole 202 fit into and through the apertures 212 formed by the outsole strips 210. This arrangement aids in maintaining the position of the midsole 202 relative to the outsole 206. In some arrangements, the midsole 202 may include a plurality of side protrusions, such as side protrusions 220. These side protrusions 220 may be formed in a heel region, as shown, or in another region of the midsole 202. The side protrusions 220 may protrude through corresponding rim side apertures 222 formed in the outsole 206. This arrangement may aid in maintaining the position of the outsole 206 relative to the midsole 202. In the arrangement shown, the side protrusions 220 and corresponding apertures 222 formed in the outsole, for instance in the rim portion 208 of the outsole 206, are generally circular or oval in shape. However, various shapes may be used, such as circular, square, rectangular, triangular, pentagonal, octagonal, and the like.

As shown in FIG. 8, the periphery of the outsole 206 may include one or more apertures 212a that permit one or more midsole protrusions 203a to extend through the aperture 212a in both a downward and lateral direction. That is, one or more single protrusion 203a may extend through the outsole aperture 212a in more than one direction. This may provide additional impact attenuation for the user along the periphery of the foot.

In some arrangements, the outsole strips 210 may be recessed into the midsole 202 between the midsole protrusions 203. That is, the midsole 202 may include a plurality of recesses 213 configured to receive the outsole strips 210. FIG. 10 is a cross-sectional view of the midsole 202 and outsole 206 arrangement described taken along line A-A of FIG. 9. The midsole protrusions 203 generally form recessed areas 213, that is, areas of higher elevation than the lower surface of the midsole protrusions 203, that receive and engage the outsole strips 210. The outsole strips 210 may be shaped to ensure they maintain a secure position within the recessed areas 213. For instance, the outsole strips 210 may generally include a bulbous end region 211 that is configured to maintain the position of the outsole strip 210 within the recessed area 213.

In some arrangements, the outsole strips 210 may generally be configured to be positioned at an elevation similar or equal to the lower surface of the midsole 202. With reference to FIG. 10, in some arrangements, the outsole strips 210 may protrude downward further than the lower surface of the midsole protrusions 203, i.e., the outsole strips 210 may have a lower surface at a lower elevation than the lower surface of the midsole protrusions 203. This arrangement of the ground engaging surface aids in providing traction for the wearer.

The outsole 206 and strips 210 forming the outsole 206 may include a plurality of nubs or other ground engaging protrusions 230. These ground engaging protrusions 230 may be configured at regions where one or more outsole strips 210 intersect or at another region of the outsole strip 210. In some arrangements, the ground engaging protrusions 230 may be randomly arranged on the outsole 206, i.e., in a non-repeating pattern. In other arrangements, the ground engaging protrusions 230 may be formed in a repeating arrangement on the outsole 206.

Each of the ground engaging protrusions 230 may be of a same or substantially similar shape. In other arrangements, the ground engaging protrusions 230 may have different shapes. For instance, the shape of the ground engaging protrusion 230 may be determined based on the region of the outsole 206 on which the protrusion 230 will be positioned. This arrangement may provide for larger ground engaging protrusions in regions where additional traction may be desired. Additionally or alternatively, the ground engaging protrusions 230 may be taped to provide additional flexibility and or traction for the wearer.

As shown in FIG. 10, the midsole 202 may also include a plurality of apertures or openings 250. The may be distributed throughout the entire midsole 202 or may be formed in one or more regions of the midsole 202. The openings 250 may aid in reducing weight associated with the midsole and may add flexibility to the midsole element 202. In some arrangements, some or all of the openings 250 may extend through the entire midsole 202 from the lateral side to the medial side. In other arrangements, some or all of the openings 250 may extend only partially through the midsole. For instance, the openings 250 may be formed in a center of the midsole 202 such that the openings 250 are not visible from the lateral or medial side of the midsole 202.

The midsole and outsole arrangement described herein may provide additional flexibility for the wearer. That is, the outsole apertures may provide a more flexible outsole component by reducing the amount of material associated with the outsole. In addition, the midsole protrusions and corresponding recessed regions generally provide additional flexibility for the wearer by permitting the midsole region to flex between the midsole protrusions, as well as along the midsole protrusions.

Additionally, the arrangement described herein may reduce weight of the article of footwear. For instance, by providing the outsole web arrangement having a plurality of apertures, the weight associated with the outsole may be reduced. The weight associated with the midsole may also be reduced by providing the recessed areas between the midsole protrusions.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of footwear, comprising:
    an upper configured to receive at least a portion of a foot of a wearer;
    an outsole having a plurality of outsole strips forming a web configuration and defining a plurality of apertures, at least a portion of the outsole strips having a cross section including a bulbous end region; and a midsole having a plurality of protrusions configured to extend through the plurality of apertures formed in the outsole and a plurality of recesses, wherein the plurality of recesses are configured to receive bulbous end regions of the outsole strips of the outsole.

2. The article of footwear of claim 1, wherein the midsole is not separable from the article of footwear.

3. The article of footwear of claim 1, wherein the outsole includes a rim section that extends around a periphery of the footwear.

4. The article of footwear of claim 3, further including a plurality of rim side apertures formed in the rim section through which a plurality of midsole side protrusions extend.

5. The article of footwear of claim 4, wherein the plurality of rim side apertures are formed in a heel region of the article of footwear.

6. The article of footwear of claim 1, further including a plurality of ground engaging protrusions formed on the outsole.

7. The article of footwear of claim 6, wherein the ground engaging members are tapered.

8. The article of footwear of claim 1, wherein the midsole is a unitary member extending substantially the entire length of the article.

9. An article of footwear, comprising:
an upper configured to receive at least a portion of a foot of a wearer;
an outsole having a plurality of outsole strips forming a web configuration and the outsole strips intersecting other outsole strips to define a plurality of apertures in the outsole, wherein at least a portion of the outsole strips have a cross section having a bulbous end region;
a plurality of ground engaging protrusions arranged on the outsole; and
a midsole having a plurality of midsole protrusions configured to extend through the plurality of apertures formed in the outsole and a plurality of recesses configured to receive the bulbous end regions of the outsole strips of the outsole.

10. The article of footwear of claim 9, wherein the plurality of ground engaging protrusions are arranged at the intersection of outsole strips.

11. The article of footwear of claim 9, wherein the midsole is not separable from the article of footwear.

12. The article of footwear of claim 9, wherein the outsole is permanently secured to the article of footwear.

13. An article of footwear, comprising:
an upper configured to receive at least a portion of a foot of a wearer;
an outsole permanently secured to the upper and having a plurality of outsole strips forming a web configuration and defining a plurality of apertures in the outsole, the outsole forming at least a portion of a ground engaging surface;
a plurality of ground engaging protrusions arranged on the outsole; and
a midsole having a plurality of midsole protrusions configured to extend through the plurality of apertures formed in the outsole and a plurality of recesses configured to receive bulbous end regions of the outsole strips of the outsole, wherein at least one midsole protrusion is formed in a side region of the midsole and includes a first protrusion portion extending laterally from the side region and a second protrusion portion extending downward.

14. The article of footwear of claim 13, wherein the midsole is not separable from the article of footwear.

15. The article of footwear of claim 13, wherein the ground engaging members are tapered.

* * * * *